United States Patent [19]
Bogusz

[11] Patent Number: 4,772,299
[45] Date of Patent: Sep. 20, 1988

[54] DEBRIS SEPARATOR FOR BRAKE COOLER

[76] Inventor: Terence J. Bogusz, 25767 Patricia, Warren, Mich. 48091

[21] Appl. No.: 903,587

[22] Filed: Sep. 4, 1986

[51] Int. Cl.⁴ .............................................. B01D 45/08
[52] U.S. Cl. ..................... 55/385.3; 55/391; 55/396; 55/463; 188/71.6
[58] Field of Search ............... 55/385 B, 385 R, 391, 55/392, 394, 396, 462–464, DIG. 28; 188/71.6, 264 AA, 264 A

[56] References Cited

U.S. PATENT DOCUMENTS

| | | | |
|---|---|---|---|
| 739,596 | 9/1903 | Friesland. | |
| 774,518 | 11/1904 | Greenaway | 55/391 |
| 1,430,066 | 9/1922 | Evans | 55/DIG. 28 X |
| 1,438,553 | 12/1922 | Quam | 55/391 X |
| 1,534,831 | 4/1925 | Berg | 55/DIG. 28 X |
| 1,580,268 | 4/1926 | Pajalic | 55/DIG. 28 X |
| 1,922,318 | 8/1933 | Mulder | 188/264 |
| 1,972,353 | 9/1934 | North et al. | 188/71.6 |
| 2,075,337 | 3/1937 | Burnaugh | 126/280 |
| 2,198,792 | 4/1940 | Schjolin | 55/385 B X |
| 2,208,525 | 7/1940 | Eksergian | 188/264 |
| 2,633,944 | 4/1953 | Butterfield | 188/264 |
| 3,355,864 | 12/1967 | Sobeck | 55/443 |
| 3,444,966 | 5/1969 | Braukhoff | 188/264 |
| 3,491,856 | 1/1970 | Dean | 188/264 |
| 3,530,649 | 9/1970 | Porsch et al. | 55/316 |
| 3,926,594 | 12/1975 | Seib et al. | 55/159 |
| 3,983,974 | 10/1976 | Dowell et al. | 188/164 |
| 4,041,569 | 8/1977 | Petersen | 15/353 |
| 4,093,038 | 6/1978 | Molin | 55/385 B X |
| 4,257,793 | 3/1981 | Kimishima et al. | 55/394 |
| 4,341,540 | 7/1982 | Howerin | 55/307 |

FOREIGN PATENT DOCUMENTS 6389 of 1899 United Kingdom ................ 55/391

*Primary Examiner*—Kathleen J. Prunner
*Attorney, Agent, or Firm*—Gifford, Groh, VanOphem, Sheridan, Sprinkle and Dolgorukov

[57] ABSTRACT

An apparatus for cooling racing car brake assemblies removes entrained contaminants from the airstream prior to allowing the cooling airstream to impinge upon the brake assembly. The apparatus first comprises a rectangular or cylindrical housing for directing the airflow, disposed at the front of the vehicle. The housing contains a conical or V-shaped baffle to serve as a first compression stage, while a tapered portion or pair of angled walls forms a second compression stage, spaced from the baffle. A tubular outlet communicates with an aperture located between the two compression stages, and cleansed air is fed to the brake assembly by a hose attached to the housing outlet. The inertia of the entrained contaminants causes them to pass somewhat linearly through the compressing stages and out a pair of exit ports at the rear of the housing. This flow-through construction obviates the need for any additional mechanism to collect or remove the separated contaminants.

16 Claims, 1 Drawing Sheet

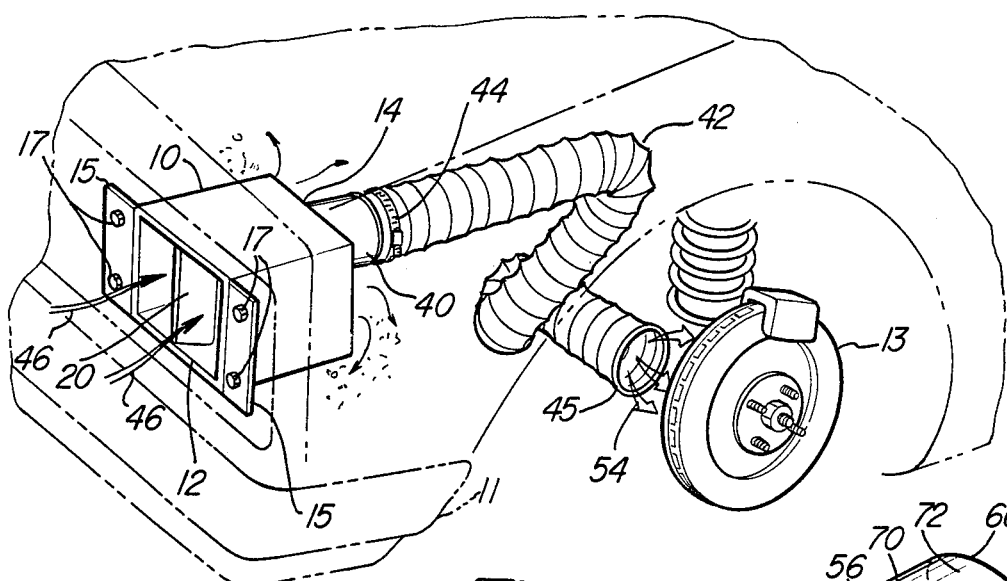
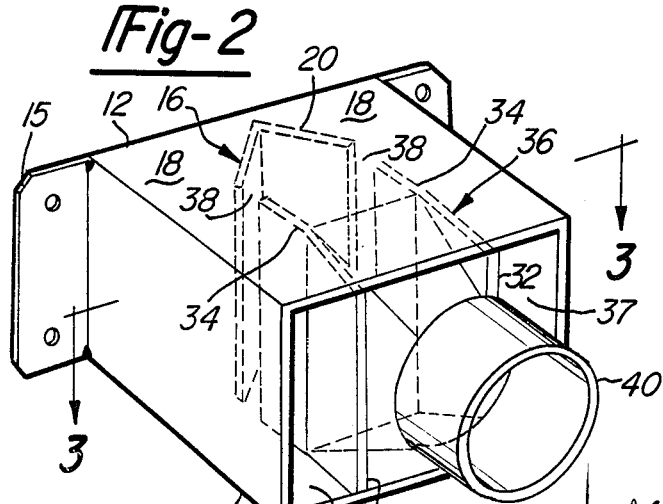
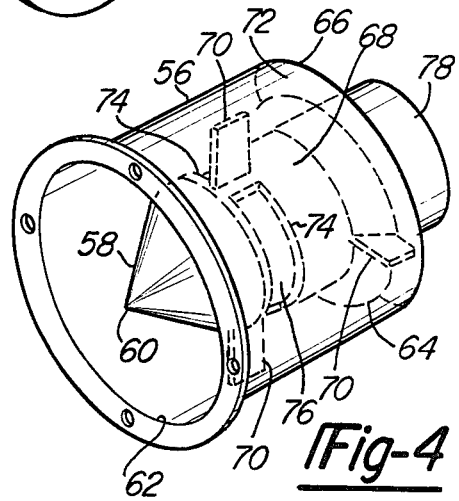
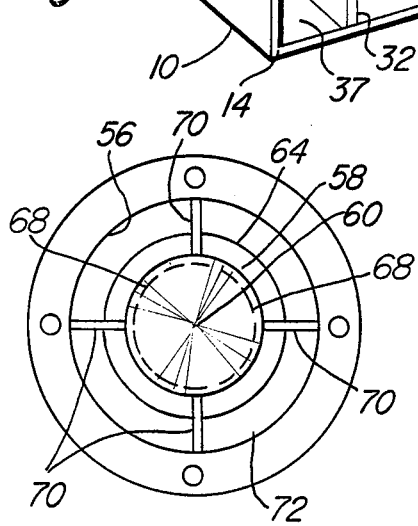
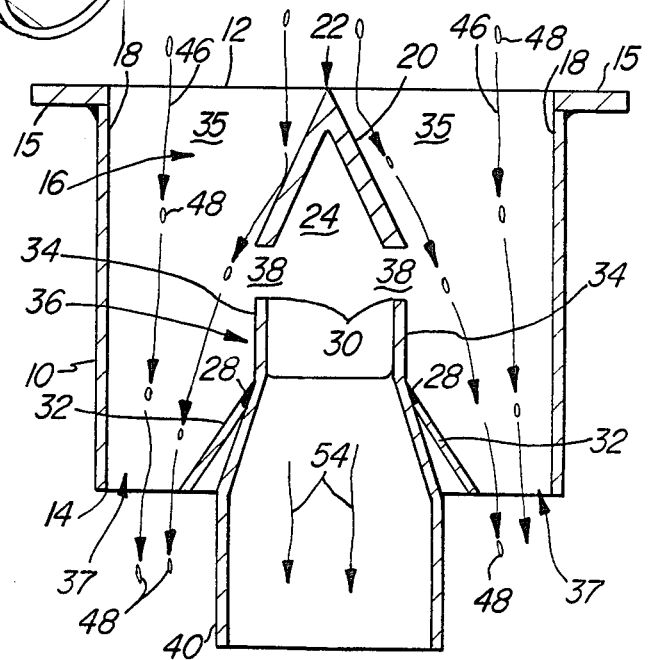

DEBRIS SEPARATOR FOR BRAKE COOLER

BACKGROUND OF THE INVENTION

I. Field of the Invention

The present invention relates to cooling devices, and more particularly to an apparatus for cooling the brakes of a vehicle.

II. Description of the Prior Art

Automobile racing has long enjoyed popularity as a sport. One type of vehicle commonly raced is the stock car, having a conventionally styled automobile body, and usually including recesses in the body front or grille for receiving headlamps.

Stock cars can achieve speeds upwards of two hundred (200) miles per hour on closed tracks. At such speeds a significant amount of energy is required to slow or stop the car. Disc brakes are most often used to slow and stop vehicles, and include a caliper which forces a wear resistant material into frictional abutment with the metal surface of a brake disc. The kinetic energy of the vehicle is transformed to thermal energy and taken up by the metal disc and friction material. Unfortunately, the heat involved on repeated or high speed braking can be so great as to decrease the friction between the metal disc and the friction pad, causing fading or failure of the brake, until the components are allowed to cool.

This problem can be obviated by cooling the brake assembly during use. Prior attempts to prevent overheating, however, have not been completely successful. While mechanical or fluid cooling structures are known, these are often very costly and complex, subject to breakdown.

One simple method for cooling brake assemblies has been to feed oncoming air from the front of the vehicle by a flexible funnel and hose, which is allowed to impinge upon the brake disc and caliper. Such a method has not been completely successful, however, since the oncoming air almost always includes particulate and contaminant matter, including tire rubber, oil absorbent, stones, dirt and other small debris, even occasionally including a metallic part such as a nut or bolt from another vehicle. Disposing a screen in the air intake has not been an adequate solution, because such screens readily clog during race conditions, particularly during longer races, and can also be perforated by dense debris, in either case deleteriously effecting the utility of the cooling device.

SUMMARY OF THE PRESENT INVENTION

The present invention overcomes these and other problems by providing an apparatus which removes entrained contaminants from the air fed to the brake assembly for cooling. The apparatus replaces the air intake funnel and screen of prior devices.

The apparatus according to the present invention comprises an airflow-directing housing, a first means attached to the housing for compressing the airflow entering it, and a second means for compressing only a first portion of the airflow. The first and second compressing means are spaced along the airflow path so as to define an aperture between them. An outlet is disposed in communication with the aperture. The second compressing means is disposed somewhat collinear with the first compressing means and includes at least one outlet port. Changes in pressure inside the housing cause the incoming air and entrained debris to accelerate while passing through the housing, and the inertia of the contaminants causes them to bypass the aperture and thus pass through the housing out the outlet port, but not the outlet. The pressure changes simultaneously also cause a second portion of the airflow, at least partially cleaned of entrained contaminants, to pass through the aperture and out of the outlet, which is then fed to the brake assembly by a flexible tube attached to the outlet. This acceleration of the airflow and its entrained contaminants is the result of the Bernoulli effect, a well known physical principle which need not be discussed in further detail here.

In a first preferred embodiment of the present invention, the housing defining the airflow path is rectangular, while the first compressing means comprises a V-shaped vertical baffle disposed at the front of the housing with its open portion facing the rear of the housing. The second compressing means preferably comprises a pair of angled, vertical walls which narrows the airflow path horizontally from front to rear. The walls extend from the rear edge of the housing towards, but short of, the rear of the baffle. The space between these walls and the baffle serves as the aperture in communication with the outlet, and the outlet is positioned between the angled walls. The apparatus is preferably constructed from an impact resistant material, such as one sixteenth inch sheet metal, although impact resistant plastic is also preferred for its ease of manipulation and lightweight construction.

In a second preferred embodiment of the present invention, the housing defining the airflow path is cylindrical. The first compressing means comprises a conical baffle centrally disposed at the front of the housing, while the second compressing means comprises a forwardly inwardly tapered frustoconical member spaced from the conical baffle by a cylindrical member. Circumferential slots are formed in the cylindrical member adjacent the cone and constitute the apertures in communication with the clean air outlet.

The present invention thus provides an efficient way of using the inertia of the contaminants to remove them from the air fed to cool the brake assembly.

BRIEF DESCRIPTION OF THE DRAWING

A better understanding of the present invention will be had upon reference to the following detailed description, when read in conjunction with the accompanying drawing, wherein like references characters refer to like parts throughout the several views, and in which:

FIG. 1 is a perspective view of the preferred embodiment of the present invention;

FIG. 2 is another perspective view of the preferred embodiment of the present invention;

FIG. 3 is a cross-sectional view taken along line 3—3 in FIG. 2;

FIG. 4 is a perspective view of another preferred embodiment of the present invention; and FIG. 5 is a front view of the preferred embodiment of the present invention shown in FIG. 4.

DETAILED DESCRIPTION OF THE PREFERRED EMBODIMENT OF THE PRESENT INVENTION

With reference first to FIG. 1, the apparatus of the present invention is thereshown mounted on a vehicle 11 and first comprises a rectangular housing 10 having a front 12 and a rear 14. The housing includes a pair of mounting flanges 15 for mounting the housing 10 behind or in the headlight recess of the vehicle 11 (not shown). The flanges 15 are affixed to the vehicle 11 by means such as a plurality of bolts 17. The vehicle 11 includes a brake assembly 13 spaced from the housing 10 but cooled by an airstream flowing through the housing 10 from its front 12 to its rear 14.

As more particularly shown in FIGS. 2 and 3, the apparatus of the present invention also comprises a first means 16 for compressing the airstream flowing through the housing 10. In a first preferred embodiment of the present invention, the first compressing means 16 comprises a V-shaped baffle 20 disposed in the housing 10 acting in cooperation with an immediately adjacent portion 18 of the housing 10. The apex 22 of the baffle 20 is positioned immediately adjacent the front 12 of the housing 10, while the open portion 24 of the baffle 20 faces the rear 14 of the housing 10.

The apparatus according to the present invention also comprises a second means 36 for compressing only a first portion of the airstream flowing through the apparatus. The second compressing means 36 is attached to the housing 10 spaced somewhat from the first compressing means 16, so as to define at least one aperture 38 between them. In the first preferred embodiment of the invention, the second compressing means 36 comprises a pair of vertical, inwardly angled walls 32 extending from the rear 14 of the housing 10 towards, but short of, the baffle 20. A parallel pair of vertical walls 34 extend from the forward edges 28 of the angled walls 32 towards, but again short of, the baffle 20. A vertical pair of apertures 38 are defined by and disposed between the forward edges 30 of the parallel walls 34 and the baffle 20. At least one and preferably a pair of exit ports 37 are defined by the rear 14 of the housing 10 and angled walls 32, at least somewhat collinear with open spaces 35 between the baffle 20 and the housing 10. The first portion of the airstream flowing through the housing 10 thus passes somewhat linearly through the first compressing means 16 and second compressing means 36.

An outlet 40 is connected to the housing 10 at its rear 14, adjacent the internal vertical walls 34, in communication with the apertures 38. A flexible hose 42 is attached to the outlet 40 by a hose clamp 44. The hose 42 preferably comprises a conventional three inch diameter flexible plastic-and-spiral wire tube, and an end 45 of the hose 42 is disposed immediately adjacent to and aligned with the brake assembly 13.

Operation of the apparatus of the present invention is straightforward. The housing 10 is mounted in the headlamp opening of the vehicle 11 by the bolts 17, and the free end 45 of the hose 42 is positioned adjacent the brake assembly 13. (For clarity, the brake assembly 13 is shown without its associated vehicle.) The motor of the vehicle 11 is then actuated to drive the vehicle 11 forward. This causes an airstream to flow in the direction of arrows 46 through the housing 10. Under race conditions the air will typically include entrained debris 48. The airstream is compressed by the first compressing means 16, and the airstream and its entrained debris 48 accelerate rearwardly of the baffle 20. The inertia of the debris 48 carries it somewhat linearly through the housing 10 and out through the exit ports 37. However, the second compressing means 36 and the lateral apertures 38 create a partial back pressure which diverts the second portion of the airstream through the apertures 38 and out the outlet 40, while only the first portion of the airstream passes through the second compressing means 36. Of course, the inertia of the entrained debris 48 substantially prevents it from being diverted through the apertures 38, so that the second portion of the airstream is effectively cleansed of its entrained debris 48. The cleansed second portion of the airstream passes through the tube 42 and out the distal end 45 of the hose 42 in the direction of the arrows 54, and impinges upon and cools the brake assembly 13.

In light of the foregoing, the selection of the particular dimensions of the apparatus should be readily apparent to anyone skilled in the art. These dimensions will depend, in part, upon the intended operating speed of the vehicle. In a most particularly preferred embodiment of the present invention, the housing 10 is six (6) inches wide, four (4) inches high and four (4) inches deep up. The flanges 15 are each four (4) inches tall and one (1) inch wide. The V-shaped baffle 20 is four (4) inches high, two (2) inches wide, and two (2) inches deep. It possesses an apical angle of about 53°. Preferably, the apical angle is less than 90°, and most preferably below about 60°, specifically, about 53°.

Also preferably, the internal walls 34 are about one (1) inch long and four (4) inches high, disposed parallel to one another and spaced two (2) inches apart. Thus, the apertures 38 formed between the first compressing means 16 and the second compressing means 36 are also one (1) inch wide and four (4) inches tall. The outlet ports 37 are similarly one (1) inch wide and four (4) inches tall, while the outlet 40 is preferably round and has an outside diameter of three (3) inches, and an inside diameter of two and three-quarters (2¾) inches. These dimensions give the apparatus a slight positive pressure inside the housing during operation, preferably a back pressure ratio of about 1.05:1 to about 1.25:1. That is, the cross-sectional area of the outlet tube (5.94 square inches) is slightly smaller than the area of the apertures (eight square inches), so that flow into the apertures is slightly disrupted. This disruption makes it more difficult for smaller, lighter grains and particulates to exit through the apertures, which are instead then preferentially carried by the first portion of the airstream out the outlet ports.

The apparatus of the present invention is most conveniently constructed from an impact resistant material, such as one-sixteenth (1/16) inch sheet metal and metal tubing. The housing can be cut from a single sheet of material, and cut, folded and welded as required. Alternatively, the apparatus can be constructed from a plastic or resinous material which is impact resistant, so as to lighten the apparatus, for fuel efficiency of the race vehicle.

A second preferred embodiment of the invention, as shown in FIGS. 4 and 5, is particularly useful when the vehicle 11 possesses recesses for round headlamps. In such a case, the housing is configured as a cylindrical housing 56 having an axis parallel to the direction of travel of the vehicle 11. The first comprising means 16 comprises a conical baffle 58 coaxially disposed in the housing 56, with its apex 60 disposed adjacent the front 62 of the housing 56. The conical baffle 58 has an apical angle preferably less than 90°, and most preferably about 70°. The second compressing means 36 comprises an inwardly tapering frustoconical member 64 extending from the rear 66 of the housing 56 towards, but short of, the conical baffle 58. A cylindrical member 68 is disposed in the housing 56 and separates the frustoconical member 64 from the conical baffle 58. Preferably, the members 64 and 68, and the baffle 58, are integrally formed, and are carried in the housing 56 by two pairs of circumferentially spaced tabs 70. The outlet from the housing 56 thus comprises a single, annular exit port 72. The cylindrical member 68 includes a pair of 116° circumferential slots 74 defining a pair of apertures 76 in communication with an outlet 78. The housing 56 and outlet 78 are connectable to the vehicle 11 and hose 42 in the same fashion as the housing 10 and the outlet 40.

Although the first and second compressing means previously described are passive, rigid structures which compress the airstream only when the vehicle moves, it is well within the scope of the present invention to include one or more active or mechanical compressing means, so long as the construction does not obviate the advantage of the somewhat linear flow path of at least part of the airstream and entrained contaminants through the first and second compressing means. The invention is particularly advantageous, however, in that no other structure (such as a screen grid, or the like) is required to remove the contaminants from the airstream. Of course, the separator of the present invention is useful with headlamp recesses of other shapes, or with vehicles having other apertures in their fronts, the housing then being configured appropriately.

Having described my invention, however, many modifications thereto will become apparent to those skilled in the art to which it pertains, without deviation from the spirit of the present invention, as defined by the scope of the appended claims.

I claim:

1. An apparatus for removing entrained contaminants from an airstream, comprising:
  a housing for directing said airstream, said housing including a front through which said airstream enters said housing and a rear spaced from said front through which said airstream exits said housing;
  first means attached to said housing for compressing said airstream at said front of said housing;
  second means for compressing a portion of said airstream, attached to said housing and being spaced rearwardly from said first compressing means, so as to form means defining an aperture between said first and second compressing means; said second compressing means being disposed at least in part collinear with said first compressing means,
  at least one outlet port formed between said second compressing means and said housing disposed at least in part collinear with said airstream exiting said first compressing means;
  said aperture facing in a direction other than towards said front of said housing;
  an outlet attached to said housing in communication with said aperture;
  wherein the ratio of the compression ratio of said second compressing means, to the compression ratio of said first compressing means, is such that a portion of said airstream is diverted through said aperture and out said outlet by said second compressing means, so that the inertia of said entrained contaminants carries them out of said housing through said at least one outlet port, whereby said diverted portion of said airstream is cleansed of said contaminants,
  wherein said apparatus further comprises a flexible hose attached to said outlet and extending away from said housing, and
  wherein said apparatus further comprises a vehicle including brake means, and said hose extends to said brake means so as to allow said diverted portion of said airstream to impinge upon said brake means.

2. The invention according to claim 1, wherein said housing is cylindrical.

3. The invention according to claim 1, wherein said housing is rectangular.

4. The invention according to claim 1, wherein said first compressing means comprises a V-shaped baffle disposed in said housing adjacent said front of said housing, said V-shaped baffle including an open portion facing said rear of said housing.

5. The invention according to claim 4, wherein said baffle possesses an apical angle of less than 90°.

6. The invention according to claim 4, wherein said baffle possesses an apical angle of less than 60°.

7. The invention according to claim 4, wherein said baffle possesses an apical angle of about 53°.

8. The invention according to claim 1, wherein said second compressing means comprises a pair of inwardly angled vertical walls extending from said rear of said housing towards, but short of, said first compressing means.

9. The invention according to claim 1, wherein said apparatus is substantially open between said housing, said first and second compressing means, and said outlet.

10. The invention according to claim 1, wherein said apparatus further comprises a vehicle, and movement of said vehicle creates said airstream.

11. The invention according to claim 1, wherein said first compressing means comprises a conical baffle disposed in said housing adjacent said front of said housing, said conical baffle including an apical portion facing said front of said housing.

12. The invention according to claim 11, wherein said conical baffle possesses an apical angle of less than 90°.

13. The invention according to claim 11, wherein said conical baffle possesses an apical angle of about 70°.

14. The invention according to claim 1, wherein said second compressing means comprises an inwardly tapering frustoconical member disposed adjacent said rear of said housing, extending towards but short of said first compressing means.

15. The invention according to claim 1, further comprising a cylindrical member disposed between said first and second compressing means.

16. The invention according to claim 15, wherein said aperture defining means comprises a plurality of circumferential slots in said cylindrical member.

* * * * *